United States Patent [19]

Kidokoro et al.

[11] Patent Number: 5,722,374
[45] Date of Patent: Mar. 3, 1998

[54] FUEL STORING DEVICE FOR AN AUTOMOBILE

[75] Inventors: Toru Kidokoro, Hadano; Takaaki Itou, Mishima; Yoshihiko Hyodo; Yukio Kinugasa, both of Susono, all of Japan

[73] Assignee: Toyota Jidosha Kabushiki Kaisha, Aichi, Japan

[21] Appl. No.: 751,380

[22] Filed: Nov. 19, 1996

[30] Foreign Application Priority Data

Nov. 20, 1995 [JP] Japan ................................ 7-301553
Nov. 14, 1996 [JP] Japan ................................ 8-303159

[51] Int. Cl.$^6$ ........................... F02M 37/04; F02M 25/08
[52] U.S. Cl. ........................................ 123/516; 123/518
[58] Field of Search ............................ 123/516, 518, 123/519; 220/4.14, 905

[56] References Cited

U.S. PATENT DOCUMENTS

| | | |
|---|---|---|
| 3,409,714 | 11/1968 | Strugar . |
| 3,617,034 | 11/1971 | Skinner . |
| 3,701,540 | 10/1972 | Pringle . |
| 3,949,720 | 4/1976 | Zipprich . |
| 3,977,379 | 8/1976 | Weissenbach . |
| 5,056,493 | 10/1991 | Holzer . |
| 5,460,135 | 10/1995 | Ohashi et al. . |
| 5,596,971 | 1/1997 | Kidokoro ........................ 123/516 |

FOREIGN PATENT DOCUMENTS

| | | |
|---|---|---|
| 60-157427 | 10/1985 | Japan . |
| 60-158922 | 10/1985 | Japan . |
| 60-158923 | 10/1985 | Japan . |
| 64-16426 | 1/1989 | Japan . |
| 7-132738 | 5/1995 | Japan . |

OTHER PUBLICATIONS

Copending U.S. Patent Application Serial No. 545,066, filed Oct. 19, 1995.

*Primary Examiner*—Thomas N. Moulis
*Attorney, Agent, or Firm*—Kenyon & Kenyon

[57] ABSTRACT

A fuel storing device for an automobile comprises a flexible separator means disposed in a fuel storage container for separating the inside of the fuel storage container into a fuel storage portion and a space portion and a fuel vapor preventing means for preventing fuel vapor from gathering in a space between a surface of fuel and said separator means. The fuel vapor preventing means introduces fuel vapor which appears over a surface of liquid fuel into a vapor draining pipe.

9 Claims, 9 Drawing Sheets

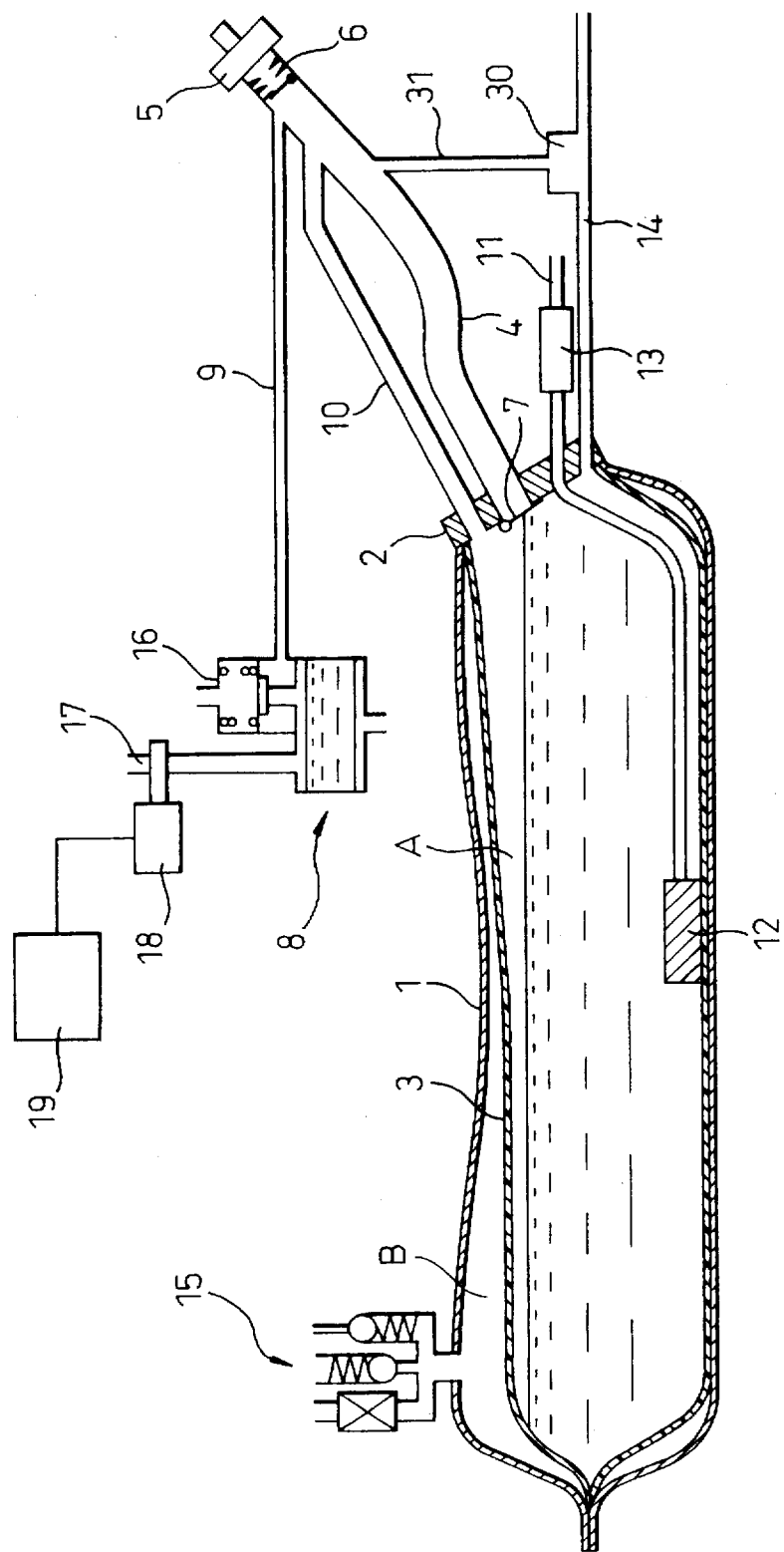

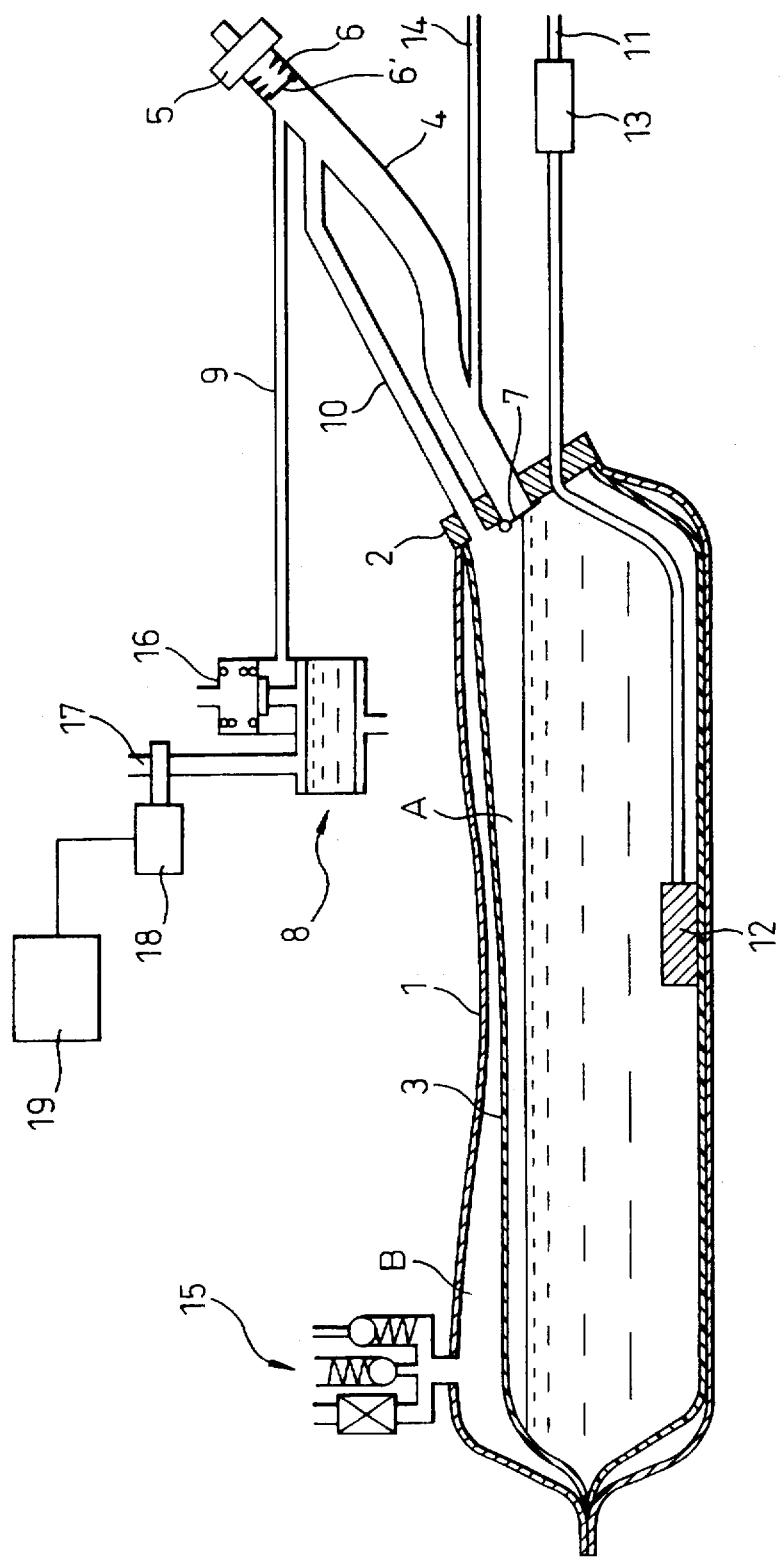

FUEL STORING DEVICE FOR AN AUTOMOBILE

BACKGROUND OF THE INVENTION

1. Field of the Invention

The present invention relates to a fuel storing device for an automobile.

2. Description of the Related Art

Many automobiles are equipped with canisters to adsorb fuel vapor generated in a fuel storing devices. The fuel adsorbed in the canister is introduced into a combustion chamber to be burned with fuel injected by fuel injectors. Automobile having such canisters can prevent fuel vapor from being dispersed into the atmosphere during driving or parking.

However, the above described system is insufficient for the future stricter evaporative gas emission regulations which will limit the amount of an evaporative gas which may be dispersed during refueling. This is because the amount of fuel vapor generated during refueling is remarkably larger than during other conditions in a conventional rigid-type fuel storage device.

If refueling is carried out through a refuel pipe when a large amount of fuel vapor is stored in a fuel string device, fuel vapor is pushed out by the newly added fuel. The fuel vapor has a large volume when the volume of space above the surface of liquid fuel is large. Therefore a conventional type fuel storage device which has a storage capacity with a constant volume cannot avoid an increase in the amount of fuel vapor when the amount of liquid fuel is small. It is required to adsorb several tens of liters of fuel vapor when the amount of fuel in the fuel storage device is small. However, it is impossible to dispose a canister having a capacity to adsorb such a large volume of fuel vapor in an automobile.

Therefore, it is required to decrease the amount of fuel vapor evaporated in the fuel storage device. Various fuel storage devices are known which eliminate the space of above the surface of liquid fuel stored in the fuel storage device to reduce an amount of evaporated fuel present in the fuel storage device. For example, a fuel storage device which has a separator film which moves up and down in accordance with the surface of the liquid fuel therein is disclosed (see Japanese Unexamined Utility Model Publication (Kokai) No. 158992).

According to the above described fuel storage device, space which is undesirably used for gathering fuel vapor is prevented from being formed, and thereby the amount of fuel vapor which exists during refueling is decreased.

However, in the above fuel storing device undesirable wrinkles appear in the separator film when the fuel volume decreases or the fuel volume is small, or refueling is carried out, or fuel is moved by acceleration, deceleration or turning of the automobile. Due to the wrinkles, spaces are formed above the surface of the liquid fuel, and fuel vapor is trapped in the spaces. If the spaces are connected to the canister, the fuel vapor in the spaces could be introduced into a canister and from there introduced into the combustion chamber to be burned before refueling, and thereby the amount of fuel vapor introduced into canister during refueling does not increase. However, the spaces are plurally formed in random positions and not the all of these spaces are connected to the canister.

Accordingly, fuel vapor in spaces which are not connected to the canister will increase in volume in accordance with a temperature increase. Therefore an increased volume of fuel vapor may be introduced into the canister. As a result, it is difficult to sufficiently decrease the volume of the canister.

Further, generally, the amount of fuel sent to the fuel injector is greater than an amount of fuel injected by the injector and the rest of the fuel is returned to the fuel storage device. This returned fuel is heated and partially vaporized once it reaches a delivery pipe (not shown) which is heated by the heat from the engine. If this vapor returns to the fuel storing device the vapor gathers above the surface of liquid fuel, and a space filled with fuel vapor is formed between the separator film and the surface of the liquid fuel.

Therefore, it is also required to introduce the fuel vapor from the returned fuel into the canister before it comes into the fuel storing device and thereby ensure that no fuel vapor gathers above the surface of liquid fuel during refueling.

SUMMARY OF THE INVENTION

An object of the present invention is to provide a fuel storing device with a separator means which can prevent fuel vapor from gathering above the surface of the liquid fuel.

According to the present invention, there is provided a fuel storing device for an automobile which comprises a fuel storage container, a flexible separator means disposed in the fuel storage container for separating the inside of the fuel storage container into a fuel storage portion and a space portion and being movable up and down in accordance with the movement of the surface of the liquid fuel in the fuel storage portion, a refuel pipe connected to the fuel storage portion, and a fuel vapor gathering preventing means for preventing fuel vapor from gathering in a space between a surface of liquid fuel and the separator means.

The present invention may be more fully understood from the description of the preferred embodiments of the invention set forth below, together with the accompanying drawings.

BRIEF DESCRIPTION OF THE DRAWINGS

In the drawings,

FIG. 10 is a general view of the sixth embodiment of the present invention; and

FIG. 11 is a general view of a variation of the sixth embodiment of the present invention.

DESCRIPTION OF THE INVENTION

Figure 1:
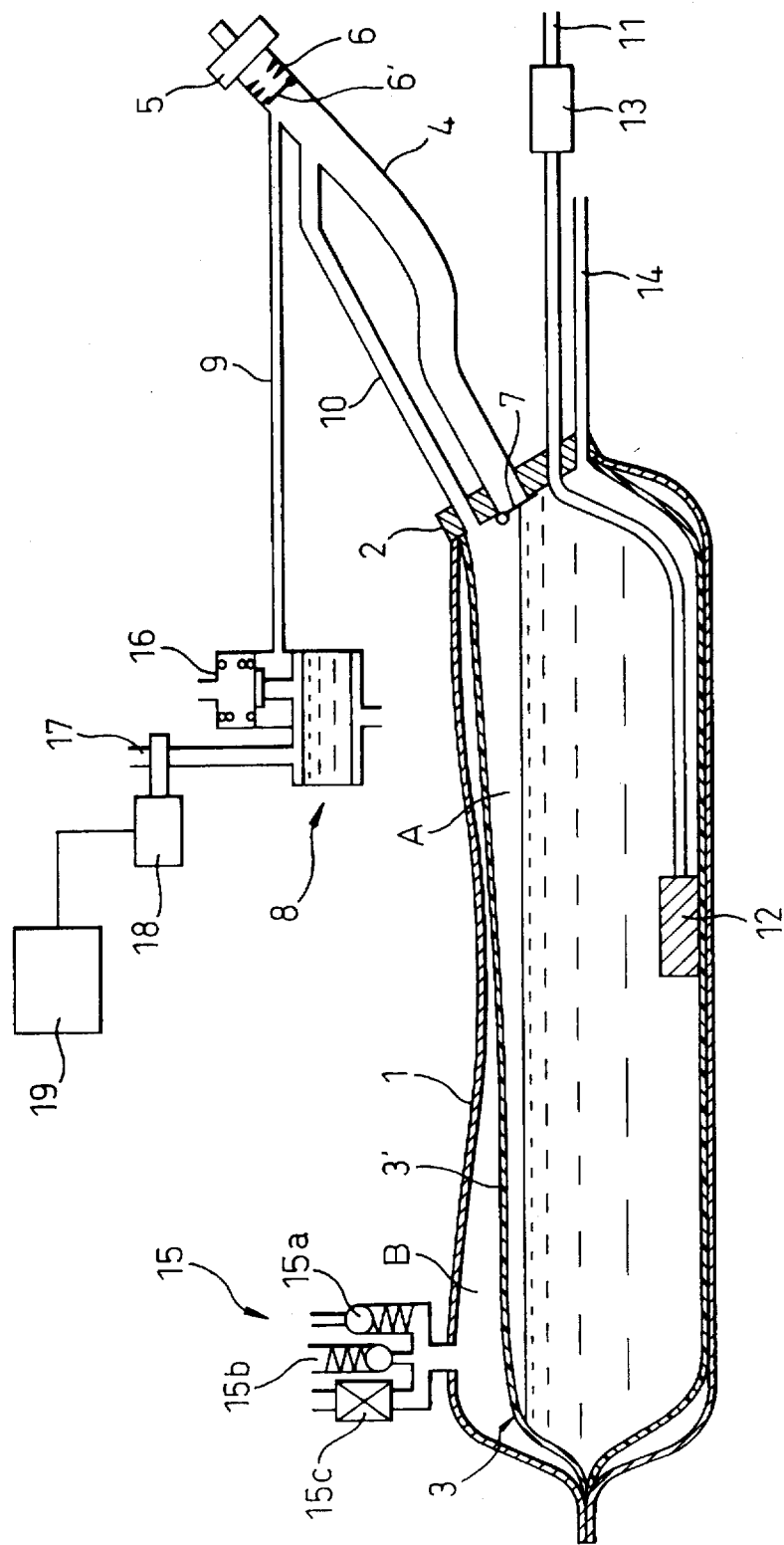
FIG. 1 is a general view of the first embodiment of the present invention.

FIG. 1 shows the construction of a first embodiment of the present invention. Referring to FIG. 1, reference numeral 1 is a tank shell made of high rigidity material such as metal or synthetic resin. A flange portion 2 is formed at one side of the tank shell 1.

A bag-shaped flexible fuel storage member 3 made of flexible material, such as nylon resin for example, is connected to the inner portion of the flange portion 2 of the tank shell 1. The bottom part of the flexible fuel storage member 3 has a greater thickness than any other part to prevent this part from wearing by rubbing on the tank shell 1 due to acceleration during a running of the automobile. However, it is also possible to fix the bottom of the flexible fuel storage member 3 to the inner surface of a bottom of the tank shell 1.

Reference numeral 4 is a refuel pipe, one end of which extends to a portion near the outer wall of the automobile body (not shown). A fuel filler cap 5 is detachably fitted to the end of the refuel pipe 4. A nozzle seal 6 disposed near the fuel filler cap 5 prevents fuel vapor from being dispersed from a portion around a fuel supply gun (not shown) to the ambient air at refueling. A puff-loss stopper valve 6' prevents fuel vapor existing in refuel pipe 4 from being dispersed when the fuel filler cap is opened.

On the other hand, a reverse flow stopper valve 7 is disposed at the inner end of the refuel pipe 4. The reverse flow stopper valve 7 prevents fuel from flowing back from the flexible fuel storage member 3 to the refuel pipe 4. A vapor draining passage 9 is attached to the refuel pipe 4 at a portion lower than the nozzle seal 6. A sub pipe 10 is disposed to introduce fuel vapor gathered in a top portion of the flexible fuel storage member 3 into a refuel pipe 4 at a portion where the vapor draining passage 9 is attached.

Reference numeral 11 is a fuel suction pipe. On one end of the fuel suction pipe 11, a fuel filter 12 is attached and extends to the bottom part of the flexible fuel storage member 3, and the other end of the fuel suction pipe extends to the fuel injector of the engine (not shown) through a fuel pump 13 which is interposed therebetween.

Reference numeral 14 is a fuel return pipe. One end of the fuel return pipe 14 is connected to the fuel suction pipe 11 at the portion near the fuel injector, for example to the delivery pipe (not shown), and the other end of the fuel return pipe 14 is extended into the flexible fuel storage member 3.

In this embodiment, to obtain a good sealing ability the tank shell 1, the refuel pipe 4, the sub pipe 10, the fuel suction pipe 11 and the fuel return pipe 14 are not directly attached to the flexible fuel storage member 3, but attached to the flange 2 on which the flexible fuel storage member 3 is attached.

Reference numeral 15 is a pressure regulator to regulate the pressure in a space B between the tank shell 1 and the flexible fuel storage member 3 so that the flexible fuel storage member 3 contacts the surface of the liquid fuel. The pressure regulator 15 is composed of a first regulator valve 15a, a second regulator valve 15b, and a third regulator valve 15c. The first regulator valve 15a opens when the pressure of a space B becomes lower than the atmospheric pressure. The second regulator valve 15b opens when the pressure of a space B becomes higher than a predetermined pressure which is higher than the atmospheric pressure to prevent the fuel in the flexible fuel storage member 3 from being too highly pressurized. The third regulator valve 15c is opened when the fuel tank lid of the automobile body (not shown) is opened so that the pressure of the space B is kept to be same as the atmospheric pressure and refueling can be smoothly carried out.

A pressure regulator valve 16 disposed between canister 8 and vapor draining passage 9 opens when a pressure inside of the flexible fuel storage member 3 exceeds a predetermined value to keep the pressure constant.

In the above described first embodiment of the present invention, the upper portion 3' of the flexible fuel storage member 3 is made to have a higher rigidity than either the side portion or the bottom portion, and the upper portion of the flexible fuel storage member 3 is connected to the upper end portion of the flange 2.

By being thus constructed, wrinkles are prevented from being formed and, as shown in FIG. 1, a space A which is upwardly slanted toward the opening of sub pipe 10 can be formed over a surface of liquid fuel even when the flexible fuel storage member 3 is full of fuel.

Therefore, fuel vapor above the surface of the liquid fuel is introduced to the upper part of the refuel pipe 4 through the sub pipe 10, and from there further introduced to the canister 8 through the vapor draining passage 9. Thus, fuel vapor is prevented from gathering above the surface of liquid fuel. The fuel vapor introduced to the canister 8 is temporarily adsorbed by an adsorber made of activated carbon, for example. The fuel adsorbed by the adsorber is introduced into the intake passage of the engine (not shown) through a purge line 17 at a predetermined operating condition of the engine and then transferred to the combustion chamber with the fuel injected by the fuel injector, and the intake air, to be burned. The purge line 17 is opened and closed by a purge control valve 18 which is controlled by an electronic control unit 19 based upon a signal from various sensors. The construction and operation of the electric control unit 19 are not described in detail, since the point of the present invention does not exist therein and many known control methods can be applied.

Figure 2:
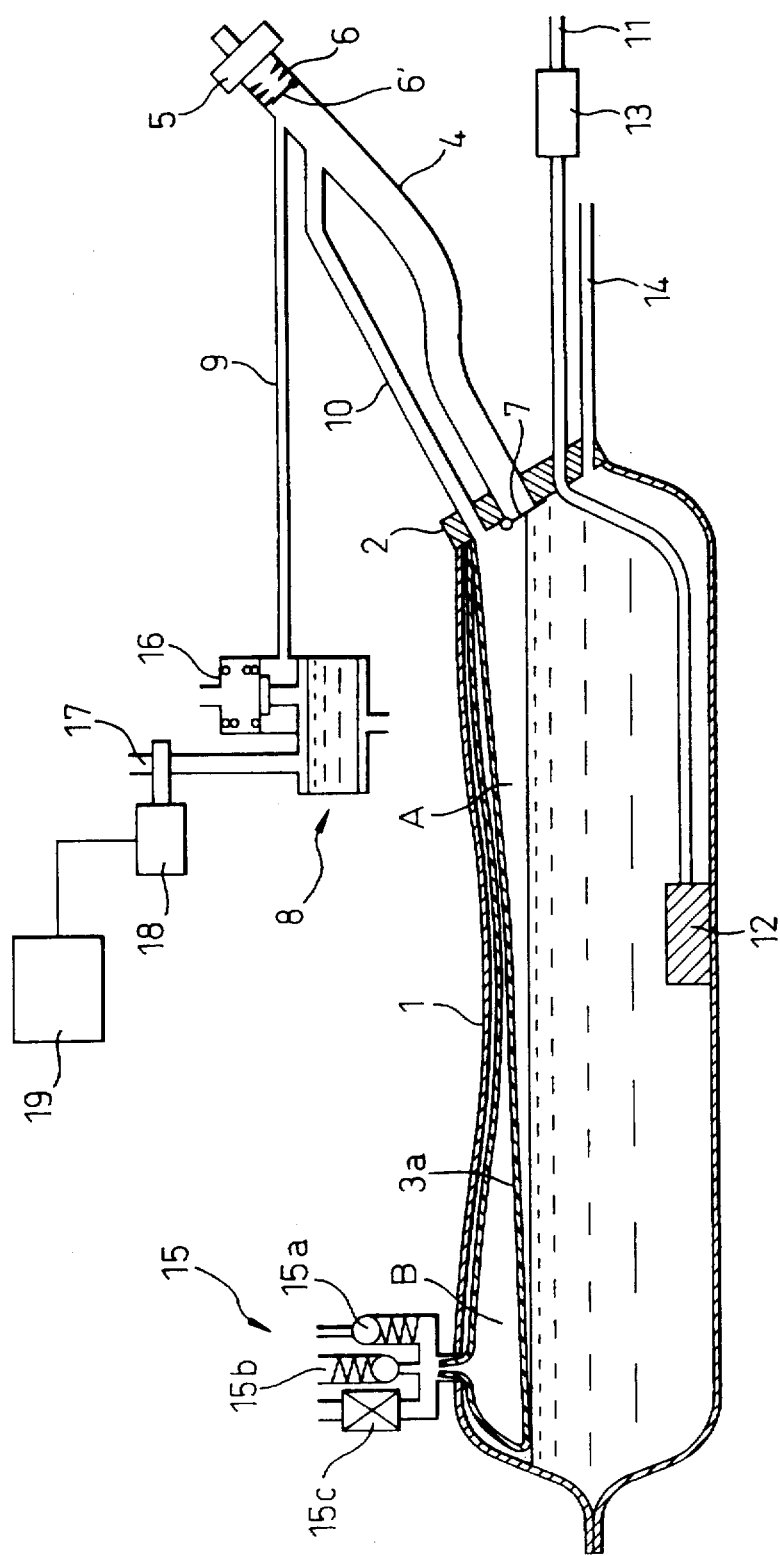
FIG. 2 is a general view of a variation of the first embodiment.

FIG. 2 shows a variation of the first embodiment. In this variation of the first embodiment, the space B between the surface of the liquid fuel and the tank shell 1 is covered by a bag-shaped flexible air storing member 3a, while the fuel is covered by a bag-shaped flexible fuel storing member 3 in the first embodiment. The pressure regulator 15 is, accordingly, connected to the flexible air storing member 3a. The flexible air storing member 3a is formed to have a slanted bottom surface in relation to the surface of the liquid fuel. Therefore, same operation as the first embodiment can be obtained.

In the above described first and second embodiments, the slanting part of the flexible fuel storing member 3 of the first embodiment, or the flexible fuel storing member 3 of the second embodiment can be formed in many different ways. For example, it can be formed to have a constant slanting angle in one way, and or it can be formed to have a slanting angle which increases as it approaches the sub pipe 10 in another way. The latter way can provide a smaller space above the liquid fuel.

Figure 3A:
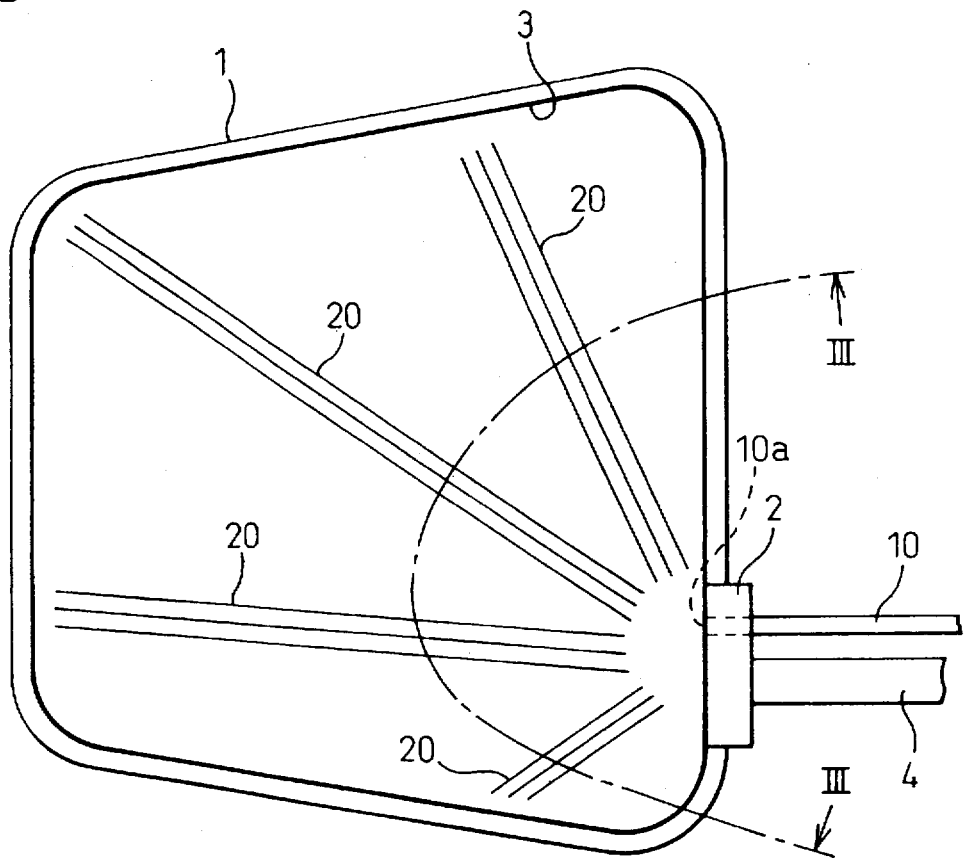
FIG. 3A is a top view showing a groove of separator means of the second embodiment of the present invention.
Figure 3B:
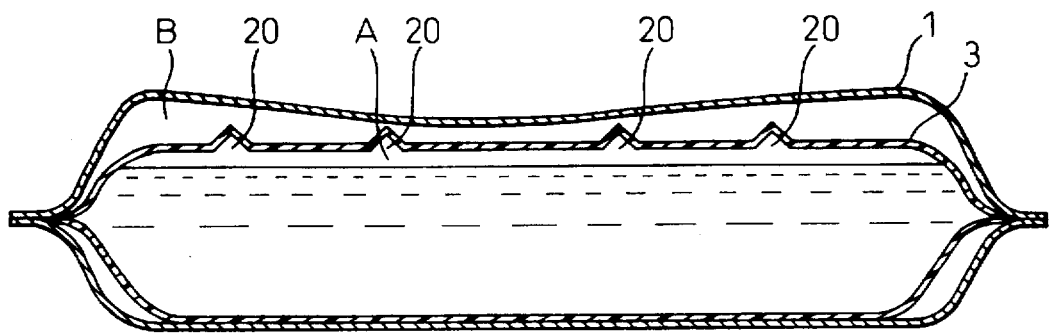
FIG. 3B is a side view showing a groove of separator means of the second embodiment of the present invention.

FIG. 3A and FIG. 3B show the construction of a second embodiment of the present invention. FIG. 3A is a top view of the second embodiment showing that a plurality of grooves 20 as guide passages projecting upwardly are formed on a top surface of the flexible fuel storing member 3. One end of each of the grooves 20 extends to a portion near the opening 10a of the sub pipe 10. Actually, refueling pipe 4, sub pipe 10, fuel suction pipe 11, fuel return pipe 14 are attached to the flange same as the first embodiment, however in the FIG. 3A, only refueling pipe 4 and sub pipe 10 are shown. FIG. 3B is a sectional view taken along line III—III in FIG. 3A, and shows that the grooves 20 are projecting upwardly.

When the second embodiment is thus constructed, the fuel vapor generated above the surface of the liquid fuel is introduced into the sub pipe 10 through the grooves 20, and thereafter introduced into the canister 8 after passing the refuel pipe 4 and vapor draining passage 9. Accordingly, fuel vapor is prevented from gathering over the surface of liquid fuel as in the first embodiment. Further, the rigidity of the flexible fuel storing member 3 near the surface of liquid fuel can be increased, and thereby the generation of wrinkles can be also prevented.

Figure 4A:
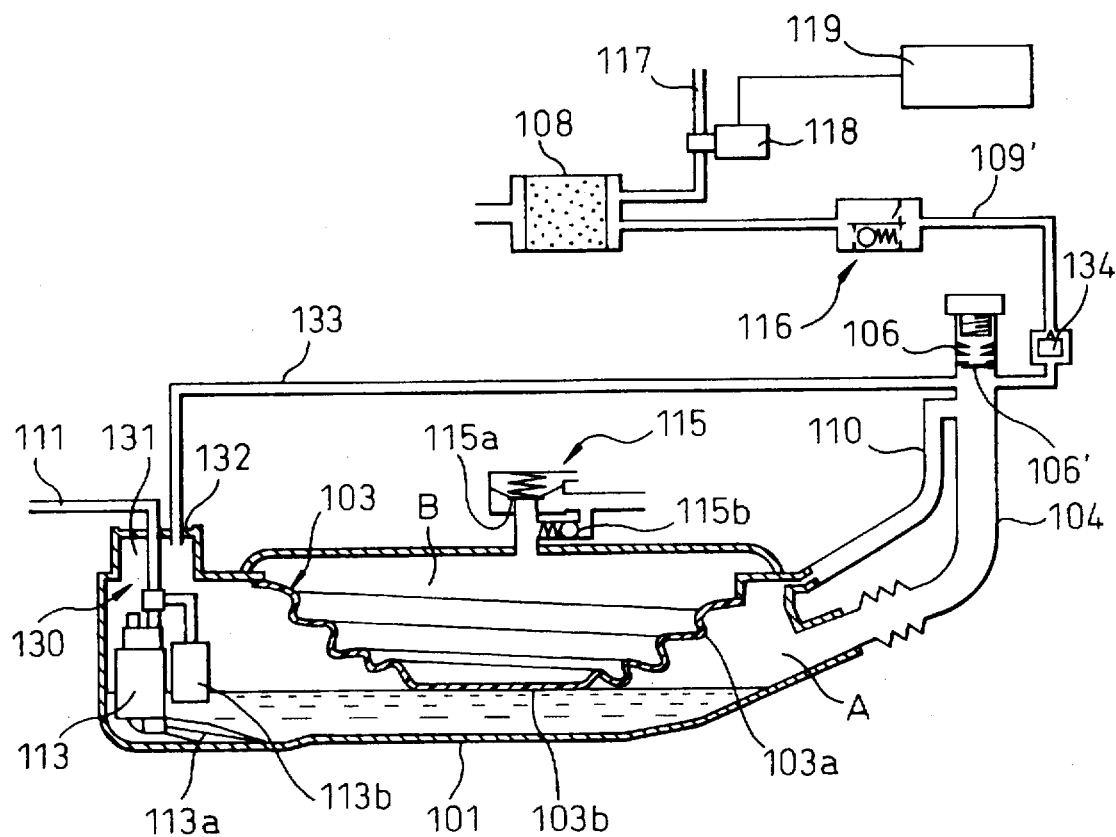
FIG. 4A is a general view of the third embodiment of the present invention.
Figure 4B:
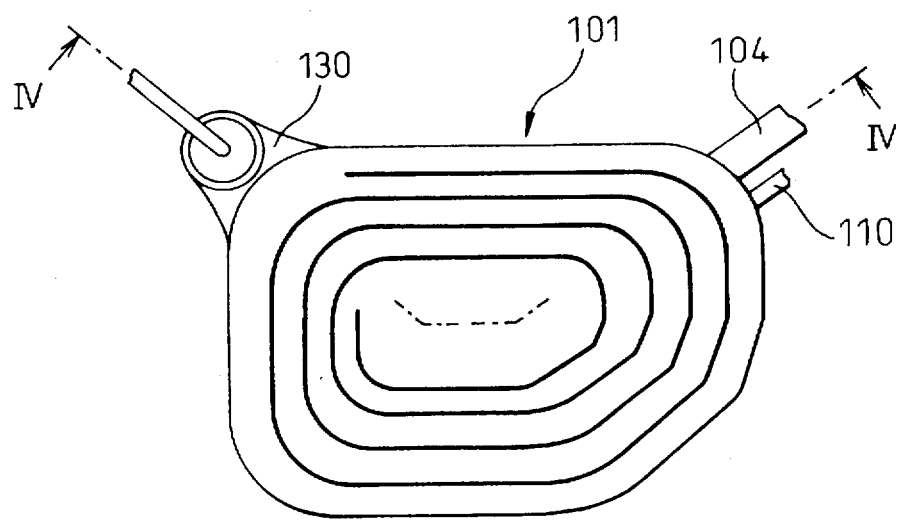
FIG. 4B is a top view showing a guide passage formed by folds of the bellows of separator film.

FIG. 4A and FIG. 4B show a construction of the third embodiment of the present invention. FIG. 4A is a side sectional view taken along line IV—IV of FIG. 4B.

In this third embodiment, the fuel storage portion and a space portion are only separated by a separator film, and the fuel is not surrounded by a bag-shaped flexible fuel storing member and space B as a space portion is not surrounded by a bag-shaped flexible air storing member.

In FIG. 4A, reference numeral 101 is a tank shell, and in tank shell 101 a separator film 103 which is composed of a bellows portion 103a as an expanding portion and a flat portion 103b. A line drawn in FIG. 4B is a fold of the bellows.

A pump chamber 130 is additionally attached to the outside of the tank shell 101. A fuel pump 113 is disposed in the pump chamber 130. The fuel pump 113 does not interfere with movement of the separator film 103 while the fuel pump 113 is disposed in the area which is integrated to the tank shell 101. The fuel pump 113 sends fuel which is sucked through a filter 113a and regulated by a pressure regulator 113b to fuel injectors (not shown) through a fuel suction pipe 111.

The uppermost portion of the pump chamber 130 is the highest position of the area which forms the container. A thick line shown in FIG. 4B is a fold of the bellows. As shown in FIG. 4B, the fold is spirally formed. The outer most portion of the spiral shaped fold of the bellows portion 103a is fixed to the top cover of the tank shell 101, and the end of a guide passage formed by the fold of the bellows portion 103a is opened near the side of the pump chamber 130. Therefore, the fuel vapor will move from a lower portion close to the surface of liquid fuel to a higher portion, and from an inner portion where the flat portion 103b of the separator film 103 exists to an outer portion where the end portion is exists and is introduced into the pump chamber upper portion 131, by following the spiral of the guide passage.

Figure 5:
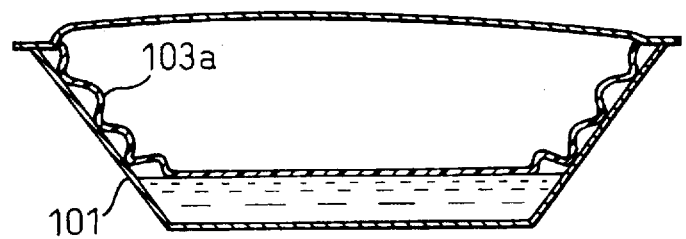
FIG. 5 shows a relation between tank shell and separator film.
Figure 6:
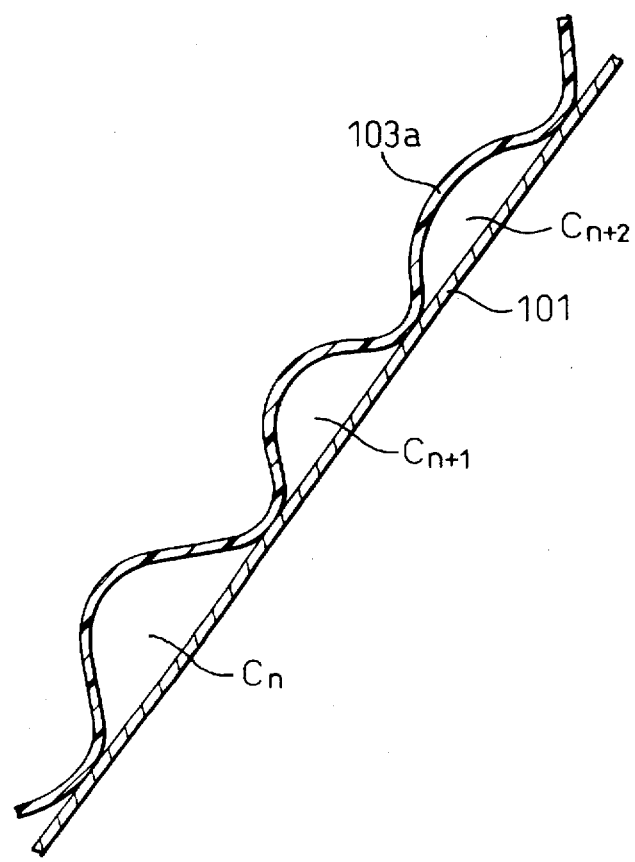
FIG. 6 is a partially enlarged view of FIG. 5.

FIG. 5 shows a general relation of the bellows portion 103a and the tank shell 101 in a portion where pump chamber 130 or refuel pipe 104 are not disposed. As shown in FIG. 5 the bellows portion 103b is formed so that it can contacts the inner surface of the tank shell 101. FIG. 6 is a partially enlarged view of FIG. 5. In this embodiment, the guide passages $C_n$, $C_{n+1}$, $C_{n+2}$ are spirally continuous, and are formed so that one end is connected to the pump chamber 130.

The outer most portion of the spinally formed fold of the bellows is attached to the upper portion of the tank shell 101 and, as described above, the end of the guide passage formed by the fold of the bellows is opened near the pump chamber 130. Therefore, the fuel vapor moves up and outwards following the spiral of the guide passage, and is introduced into the upper portion 131 of the pump chamber 130.

A vapor transport line 133 is attached to the top cover 132 of the pump chamber 130 at one end, and is attached to the refuel pipe 104 at the other end. The fuel vapor guided to the pump chamber upper portion 131 is introduced to the upper portion of the refuel pipe 104 through the vapor transport line 133, and from there is introduced to a canister 108 through a vapor draining line 109.

A roll-over valve 134 is interposed in the vapor draining line 109 to prevent liquid fuel from entering into the canister 108. A regulator valve 116 opens so that the fuel vapor flows to the canister 108 when the pressure of the fuel vapor in the fuel storage portion becomes higher than a predetermined value. Thereby, the pressure of the fuel vapor in the fuel storage portion is controlled to be within a predetermined range.

The fuel adsorbed by the canister is introduced into the intake passage of the engine (not shown) through a purge line 117 as in the first to third embodiments. Reference numerals 118 and 119 are respectively a purge control valve and an electric control unit which work the same as the purge control valve 18 and the electronic control unit 19 in the first to third embodiments.

A regulator 115 disposed on the top cover of the tank shell 101 is composed of a positive pressure regulator 115a to prevent the fuel vapor pressure from rising by regulating the pressure of space B to be a positive pressure higher than the atmospheric pressure and a negative pressure regulator 115b to enable the separator film 103 to smoothly contact the surface of liquid fuel.

The refuel pipe 104 is provided with a nozzle seal 106, a puff-loss valve 106' and a sub-pipe 110 in the same manner as the first and second embodiment.

Figure 7A:
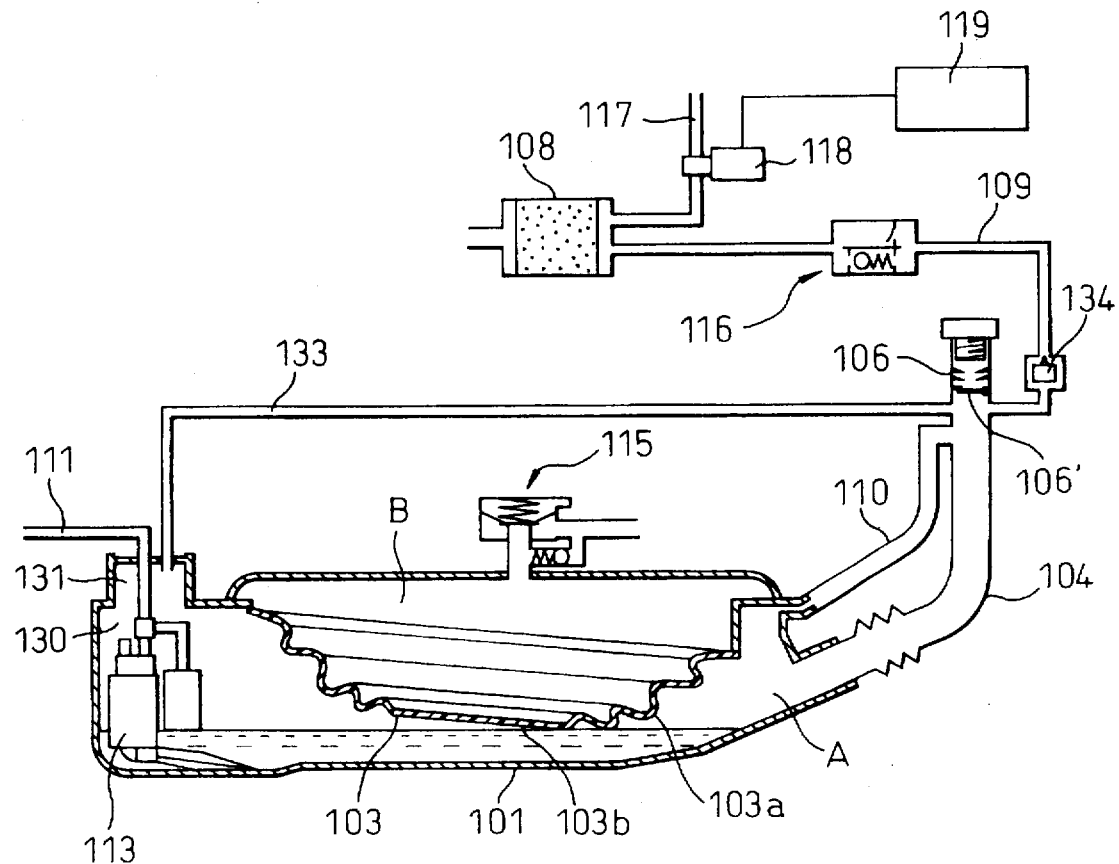
FIG. 7A is a general view of the fourth embodiment of the present invention.
Figure 7B:
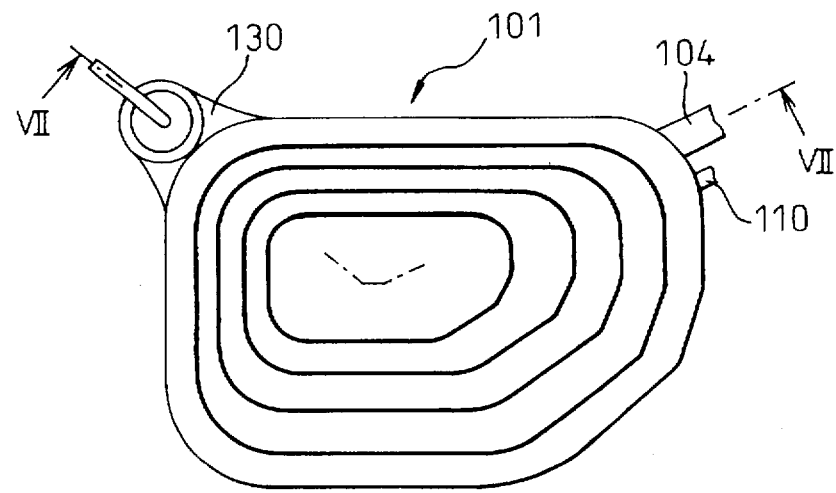
FIG. 7B is a top view showing a guide passage formed by folds of the bellows of separator film of the fourth embodiment.

FIG. 7A and FIG. 7B show the construction of a fourth embodiment of the present invention, in which a fuel storage portion and a space portion are separated by a separator film having a bellows portion 103a and a flat portion 103b as in the third embodiment. However, in this fourth embodiment the bellows portion has a plurality of closed folds of different sizes instead of the one continuous spiral fold of the third embodiment. As shown in FIG. 7A, the bellows portion 103a and the flat portion 103b are slanted, so that the fuel vapor is introduced to the portion of the fuel storage portion near the pump chamber 130. Each fold can be partially pressed to be flat so that the fuel vapor can easily move from the inner most fold to the adjacently outer located fold, and finally to the upper portion 131 of the pump chamber 130. It is also possible to form bridges between the inner fold and the outer fold.

Figure 8:
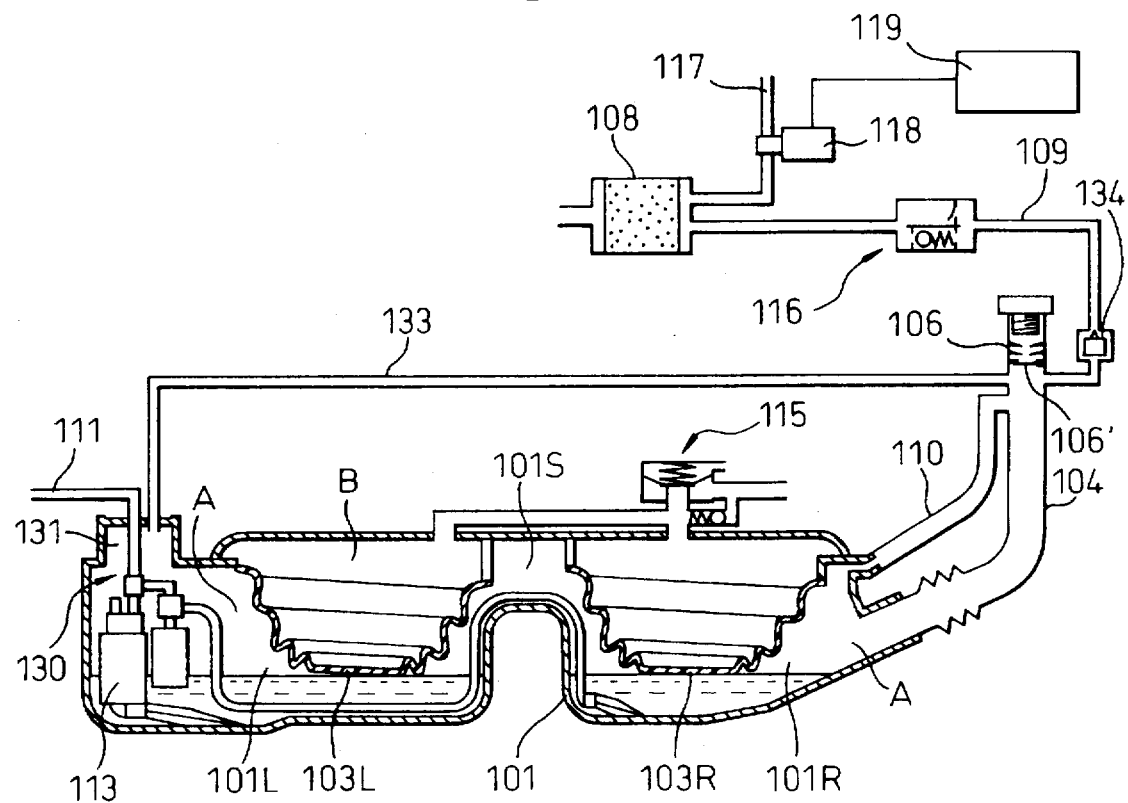
FIG. 8 is a general view of the fifth embodiment of the present invention.
Figure 9:
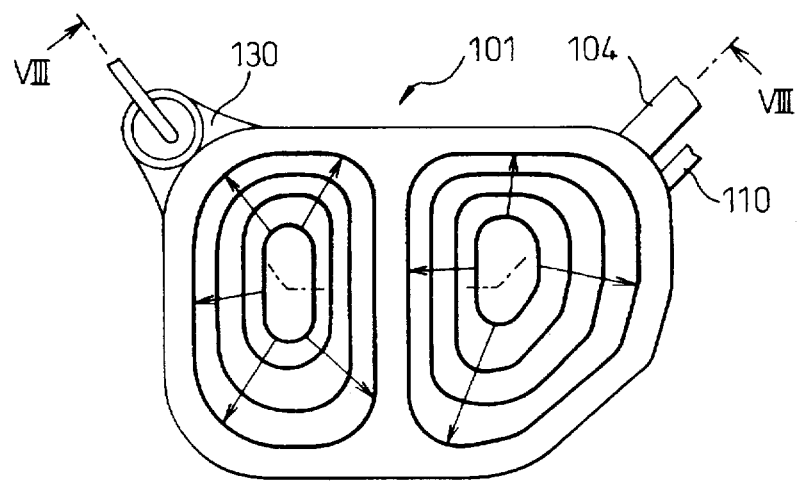
FIG. 9 is a top view showing a guide passage formed by folds of the bellows of separator film of the fifth embodiment.

FIG. 8 and FIG. 9 show a construction of the fifth embodiment of the present invention. In this fifth embodiment, the bottom of the tank shell 101 rises at a central portion to allow arrangement of the exhaust pipes, drive shaft or other parts of the automobile. Therefore, the fuel storing portion is divided into 101L and 101R which are connected to each other by 101S. The two divided fuel storing portions 101L and 101R respectively have a separator film having a bellows portion and a flat portion as in the fourth embodiment.

Reference numeral 103L is a separator film disposed near the pump chamber 130, and reference numeral 103R is a separator film disposed apart from the pump chamber 130. The fuel vapor gathered above the surface of liquid fuel in the fuel storing portion 101L moves from the inside to the outside of the separator film 103L, and upwards, by following the guide passage formed by the fold of the bellows potion of the separator film 103L, and enters into the upper portion 131 of the pump chamber 130.

The fuel vapor gathered above the surface of liquid fuel in the fuel storing portion 101R moves, in the same manner, to the highest position of the bellows portion of the separator film 103R by following the guide passage formed by the fold of the bellows potion of the separator film 103R. From there, the fuel vapor moves to the pump chamber 130 through the highest positioned fold of the bellows portion of the separator film 103L, and enters into the upper portion 131 of the pump chamber 130.

Thus, even in a fuel storage device which has a plurality of separator films, fuel vapor can be guided by a guide passage disposed on the separator film, and thereby an increase in the amount of the fuel vapor above the surface of the liquid fuel is suppressed. Further, no complicated piping for the draining of the fuel vapor is required in such a separated construction.

Hereinafter, measures against fuel which was sent to the fuel injectors but was returned to the tank shell because of an excess is described in the case of the first embodiment of the fuel storing device which has a flexible fuel storing member 3.

In the first embodiment type fuel storing device, fuel in the tank shell 1 is sent to a delivery pipe (not shown) located near the engine.

Fuel which is sent to the delivery pipe, but not injected by the injectors, returns to the tank shell 1 through the fuel return pipe 14.

The delivery pipe is located near the engine, and is accordingly heated to a high temperature. Therefore, any returned fuel which passes through the delivery pipe is heated and partially vaporized. It is possible that fuel vapor will gather above the surface of liquid fuel i.e. in the space A, if the partially vaporized fuel returns into the flexible fuel storing member 3 in the tank shell 1.

Therefore, in the sixth embodiment shown in FIG. 10, a fuel separator 30 for separating the returned fuel into liquid fuel and fuel vapor is interposed in the fuel return line 14 for preventing the fuel vapor of the returned fuel from being introduced into the tank shell 1.

The fuel separator 30 has a volume, i.e. a space, in the upper portion thereof, for collecting the fuel vapor of the returned fuel. The volume of the separator 30 is communicated to the refuel pipe 4 through a pipe 31. Other constructions are same as the first embodiment, therefore no descriptions are provided of them.

The fuel vapor in the returned fuel which is partially vaporized by being sent to the delivery pipe is separated in the volume of the separator 30.

The separated fuel vapor is introduced into the refuel pipe 4 through the pipe 31, and from there introduced into the canister 8 through the vapor draining pipe 9. Only the liquid fuel is returned to the flexible fuel storage member 3 of tank shell 1.

Thus the fuel vapor in the returned fuel is separated before it returns into the flexible fuel storing member 3, and thereby the fuel vapor is prevented from gathering above the surface of liquid fuel in the flexible fuel storing member 3.

FIG. 11 shows a variation of the sixth embodiment. In this variation of the sixth embodiment the fuel return pipe 14 is connected to the refuel pipe 4, instead of to the fuel separator 30 in the fuel return pipe 14 which is connected to the tank shell 1.

The fuel returned into the refuel pipe 4 is separated into liquid fuel and fuel vapor in a space in the refuel pipe 4.

The separated fuel vapor is introduced into the canister 8 through the vapor draining passage 9, and only the liquid fuel flows in the refuel pipe 4 and returns into the flexible fuel storing member 3 by opening the reverse flow stopper valve 7 at lower end thereof with the flow of liquid fuel itself. The liquid fuel returns into the flexible fuel storing member through sub pipe 10, when the refuel pipe 4 is almost full and the reverse flow stopper valve 7 is not opened.

This variation does not require the fuel separator 30, and therefore has an advantage of obtaining a simpler fuel return system as compared with the sixth embodiment.

Further, better liquid-vapor separating ability is obtainable, since a larger volume of space can be attained for separating the returned fuel by using the refuel pipe 4 as a separator.

The film type separator as used in the third, fourth and fifth embodiments can be applicable to the first, second, fifth and sixth embodiments and the bag shaped separator used in the first, second and fifth, sixth embodiments can be applicable to the third, fourth and fifth embodiments.

As described above, according to the present invention the generation and increase of the fuel vapor above the liquid fuel is suppressed, and thereby the canister volume can be minimized.

We claim:

1. A fuel storing device for an automobile comprising:
   a fuel storage container;
   a flexible separator means disposed in the fuel storage container for separating the inside of the fuel storage container into a liquid fuel storage portion, a fuel vapor channel situated between a first surface of the separator means and an upper surface of liquid fuel in the fuel storage portion and a space portion, the flexible separator means being moveable up and down in accordance with the movement of the surface of liquid fuel, wherein the separator means is positioned relative to the upper surface of liquid fuel so that a height of the fuel vapor channel increases gradually from a minimum at a first end thereof to a maximum at a second end thereof;
   a refuel pipe connected to the fuel storage portion; and
   a fuel vapor draining pipe for draining fuel vapor into an intake passage of an engine, the fuel vapor draining pipe including at least one inlet located adjacent to the second end of the fuel vapor channel.

2. A fuel storing device according to claim 1, wherein the separator means is shaped so that an elevation of a line along the first surface of the separator means increases as it approaches the second end of the fuel vapor channel to direct the fuel vapor to the inlet of the fuel vapor draining pipe.

3. A fuel storing device according to claim 1, wherein the fuel vapor channel includes a guide passage formed on the first surface of the separator means to direct the fuel vapor to the fuel vapor draining pipe.

4. A fuel storing device according to claim 1, wherein the separator means includes a bellows portion and, wherein the fuel vapor channel includes a guide passage formed by folds of the bellows portion.

5. A fuel storing device for an automobile comprising:

a fuel storage container;

a flexible separator means disposed in the fuel storage container for separating the inside of the fuel storage container into a liquid fuel storage portion, a fuel vapor channel situated between a first surface of the separator means and an upper surface of liquid fuel in the fuel storage portion and a space portion, the flexible separator means being moveable up and down in accordance with the movement of the surface of liquid fuel;

a refuel pipe connected to the fuel storage portion;

a fuel vapor draining pipe for draining fuel vapor into an intake passage of an engine;

a fuel return pipe for returning fuel from a fuel injection system of the engine to the fuel storage portion;

a fuel liquid-vapor separator which separates fuel returning in the fuel return pipe into liquid fuel and fuel vapor and introduces the liquid fuel into the fuel storage portion and introduces the fuel vapor into the fuel vapor draining pipe.

6. A fuel storing device according to claim 5, wherein a portion of the refuel pipe acts as the fuel liquid-vapor separator.

7. A fuel storing device according to claim 1, wherein the flexible separator means is bag-shaped to surround one of the fuel storage portion and space portion.

8. A fuel storing device according to claim 3, wherein the separator means includes a substantially smooth portion situated adjacent to the upper surface of the liquid fuel and wherein the guide passage winds around the substantially smooth surface gradually ascending from a lower end adjacent to the upper surface of liquid fuel to an outlet to direct fuel vapor to the inlet of the fuel vapor draining pipe.

9. A fuel storing device according to claim 5, wherein the flexible separator means is bag-shaped to surround one of the fuel storage portion and the space portion.

* * * * *